Figure 1:
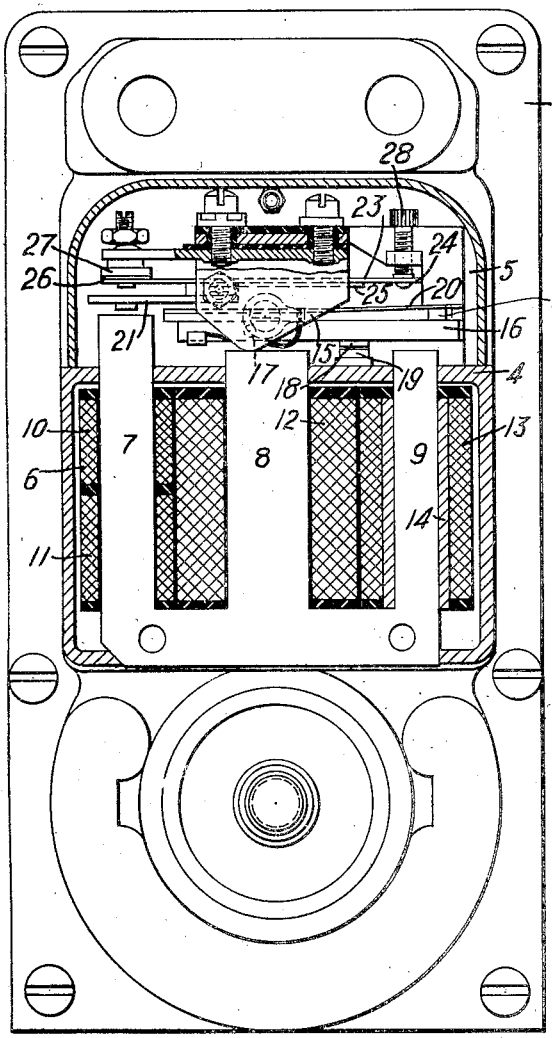

F. CONRAD.
REGULATOR AND CUT-OUT.
APPLICATION FILED AUG. 7, 1914.

1,260,649.

Patented Mar. 26, 1918.

Metals having different temperature co-efficients

WITNESSES:
Fred A. Lind
J. P. Langley

INVENTOR
Frank Conrad
BY
Burley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

REGULATOR AND CUT-OUT.

1,260,649.

Specification of Letters Patent.  Patented Mar. 26, 1918.

Application filed August 7, 1914. Serial No. 855,547.

*To all whom it may concern:*

Be it known that I, FRANK CONRAD, a citizen of the United States, and a resident of Pittsburgh, in the county of Allegheny and State of Pennsylvania, have invented a new and useful Improvement in Regulators and Cut-Outs, of which the following is a specification.

My invention relates to regulators and cut-outs, and it has particular reference to such mechanisms as may be employed in connection with battery-charging systems of automobiles or other motor vehicles.

One object of my invention is to provide a simple and efficient means for regulating the voltage at which energy is supplied to a storage device in accordance with the temperatures of the source and of the storage device.

A second object of my invention is to provide a mechanism for effectively controlling the circuits of a battery-charging system.

In the operation of generators that are operatively connected to the engines of motor-driven vehicles, it is necessary to provide suitable controlling and regulating means in connection therewith because of the various speeds at which such vehicles are operated. The voltage of the generator must be so regulated as to prevent an excessive voltage which may cause damage to the storage battery or destroy the lamps of the vehicle. Means must be provided, also, to prevent a battery from discharging back through the generator when the voltage of the former exceeds that of the latter.

It is well known that, in the operation of charging storage batteries which are at a comparatively low temperature, it is desirable to apply a higher voltage than that employed at normal temperatures. This condition obtains not only with reference to the variations in temperature incident to the weather, but also, to a single charging operation, since the temperature of the battery rises appreciably as the charging operation proceeds. The various regulating devices in use do not, ordinarily, comprise efficient automatic means for compensating for temperature variations.

I provide a mechanism that comprises a regulator and a cut-out which operate independently to automatically perform the separate functions, but have certain structural elements in common to form a unitary structure. My invention provides, also, a simple and effective means in connection with the regulator mechanism for automatically compensating for variations in temperature in order that the voltage of the generator may have a value that is best adapted to the existing temperature.

Figure 2:
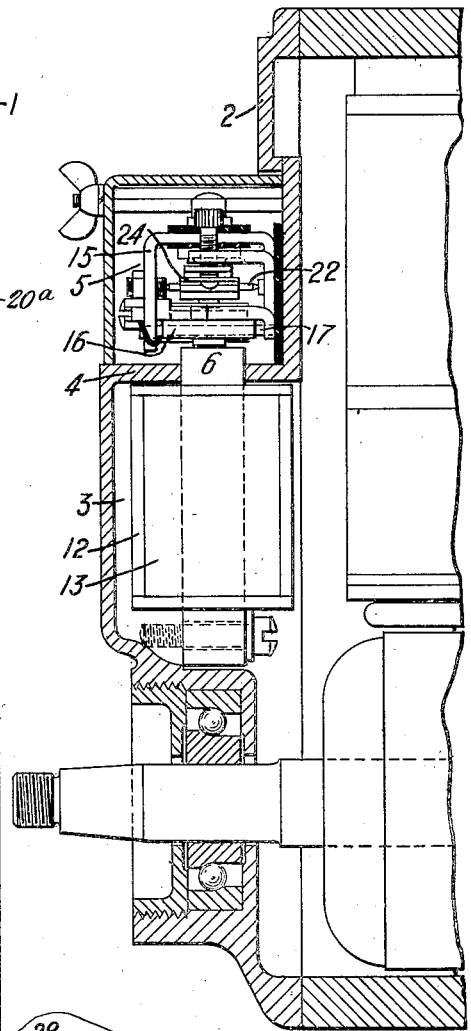
Figure 3:
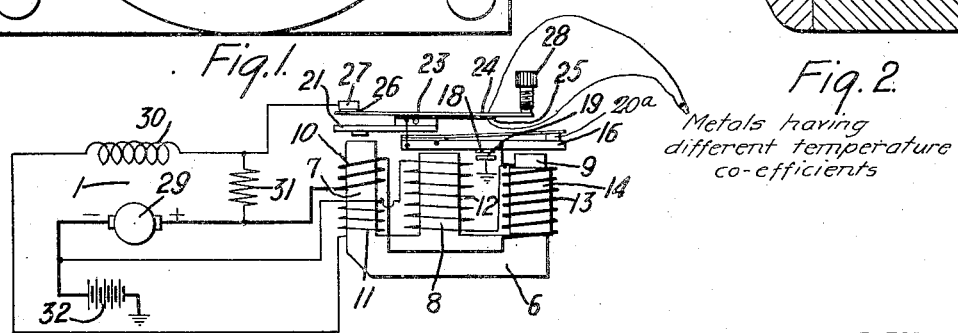

In the accompanying drawings, Figure 1 is an end view, partially in elevation and partially in section, of an electric generator having an automatic controlling device attached thereto. Fig. 2 is a side view, partially in elevation and partially in section, of the apparatus shown in Fig. 1, parts being broken away. Fig. 3 is a diagrammatic view of circuits and apparatus embodying my invention.

Referring particularly to Figs. 1 and 2, an electric generator 1 comprises an end casing 2 having a chamber or recess 3. The casing 2 comprises a horizontal portion 4 which covers the recess 3 and which constitutes one wall of a casing having a circuit-controlling mechanism 5.

The circuit-controlling mechanism comprises an electromagnet that is mounted in the recess 3 and comprises a body member 6 that is provided with leg members 7, 8 and 9 which project through suitable openings in the portion 4 of the casing. The leg member 7 constitutes a core member for two magnet coils 10 and 11. The leg members 8 and 9 constitute core members for magnet coils 12 and 13, respectively. The leg member 9 is surrounded, also, by a copper tube 14 which operates as a damper winding, for a purpose to be later described.

A yoke member 15, which is connected to and insulated from, the casing 2, supports the movable members of the circuit-controlling mechanism. The cut-out mechanism comprises an armature member 16 which bridges the leg members 8 and 9 and is pivotally supported upon a pin 17. A contact member 18, which is mounted upon, and connected to, the armature 16, coacts with a stationary contact member 19 that is mounted upon the horizontal portion 4. Normally, a spring 20 operates to maintain the armature 16 in its upper position, with the contact members 18 and 19 disengaged, one end of the said spring being attached to the armature and the other end engaging a stop 20ª.

A second armature member 21, which bridges the leg members 7 and 8 and is pivotally supported by a pin 22, constitutes the actuating member of the regulator mechanism. A spring 23, which tends to maintain the armature 21 in its upper position, is composed of two strips of metal having different coefficients of expansion. While the metals employed may be any that are suitable for the purpose, I preferably employ a very thin steel spring 24 which is welded, or otherwise connected, to a bar 25 of a metal or alloy of which nickel is the principal constituent and which has, therefore, a low coefficient of expansion. The steel spring 24, which extends beyond the bar 25, is provided, at one end, with a contact member 26 which coacts with a stationary contact member 27. The tension of the spring 23 is regulated by an adjusting screw 28. Since a fall in temperature causes the steel strip 24 to contract more than the nickel bar 25, the spring 23 tends to become concave, as viewed from the top. The spring operates with an increased tension to maintain the armature 21 in its upper position, with the contact members 26 and 27 engaged. A rise in temperature operates to decrease the tension of the spring 23, as will be readily understood.

The circuits and apparatus embodied in my invention are diagrammatically illustrated in Fig. 3. The generator 1, the armature of which is indicated at 29, has a shunt field winding 30 which is connected in circuit with a resistor 31.

The coils 10 and 11, which are respectively in series and in shunt with the generator armature 29, normally produce opposite and substantially equal effects upon a magnetic circuit which includes the leg members 7 and 8 and the armature 21. The coils 10 and 11 may be termed the series compensating coil and the shunt compensating coil, respectively, for reasons hereinafter given. The coil 12, which is connected in shunt relation to the generator armature 29, is composed, either wholly or in part, of a material or metal or alloy having a very low, or a negligible, temperature coefficient. Each of the other magnet coils is of copper, or other suitable conducting material. The coil 13, which is in series relation to the generator armature 29, is arranged to produce a magnetizing effect which is normally substantially equal and opposite to that of the series coil 10. The major portion of the flux induced by the coil 13 assists that induced by the coil 12, which is the main coil of the magnet.

The flux induced by the shunt coil 12 traverses two branch magnetic circuits, one comprising the members 8, 7 and 21, and the other, the members 8, 9 and 16. The core member 8 is common to both magnetic circuits. The coil 13 induces a flux which traverses the last-mentioned magnetic circuit, its core member 9 being included therein. Flux induced by the coil 13 tends to traverse a magnetic circuit comprising members 9, 16, 21 and 7 but the reluctance of this circuit is so high, relatively to that of the magnetic circuit 9, 16, 8, that only a small portion of its magnetomotive force is effective in the former circuit to oppose the flux induced therein by the coil 12. This tendency of the coil 13 to oppose the shunt coil 12 is neutralized or compensated for by the series coil 10 which induces flux in a direction to assist the shunt coil 12.

The armature 16 extends beyond its point of support to overlap the armature 21. The length of the air gap between the armatures varies according to the position of the armature 16, the air gap having the greater length when the armature 16 is in its upper position. This arrangement insures that, when the armature 16 is in its upper position, the reluctance of the magnetic circuit including the armature 21 is increased and that the generator will be regulated for a higher voltage until the charging circuit has been completed by the armature 16 and contact members 18 and 19.

Normally, the armatures 16 and 21 are in their respective upper positions, with the contact members 18 and 19 disengaged and the contact members 26 and 27 connected to, in effect, exclude the resistor 31 from the circuit of the field winding 30. When the generator is operated, current traverses a circuit extending from the positive terminal of the generator through the series coil 10, series coil 13, armature 16 and shunt coil 12 to the negative terminal of the generator. Current traverses, also, a branch circuit extending from the armature 16 through the spring 23, contact members 26 and 27, shunt field winding 30 and coil 11 to the negative terminal of the generator. When the generator voltage reaches such a value that the magnetic circuit which includes the legs 8 and 9 and armature 16, is sufficiently energized, the latter is drawn downwardly to connect the contact members 18 and 19. The charging circuit of the generator, which is thus completed, extends from the positive terminal of the generator, through coils 10 and 13, and contact members 18 and 19 to ground, and thence, through a battery 32, to the negative terminal of the generator. The series coil 13 now operates as a holding coil to assist the shunt coil 12 in retaining the armature 16 in its lower position.

The voltage of the generator is regulated by the means for controlling the effective value of the resistor 31. The steel spring 24, which carries the contact member 26, is very thin and vibrates at a relatively high frequency to separate the contact members 26 and 27. The vibration of the spring 24 is caused by the shocks incident to the engagement and disengagement of the contact members 26 and 27 and by the vibration of the generator in connection with which the regulator is employed. The rate of vibration of the spring 24, which is caused by mechanical shocks, is entirely independent of the rate of vibration of the armature 21 which is effected by electromagnetic means. The vibration of the spring 24 is damped, however, when the contact members 26 and 27 engage, to a degree depending upon the force with which the contact member 26 is actuated toward the contact member 27. When the voltage rises above the predetermined value for which the mechanism is adjusted, the armature 21 is drawn downwardly to prevent the engagement of the contact members 26 and 27 and thereby insert the resistor 31 in circuit with the field windings 30 for a relatively long period. The generator voltage decreases because of the weakened field, and, when it reaches the predetermined value, the armature 31 is released, and the rapidly vibrating spring 24 again effects the engagement of the contact members 26 and 27.

When the contact terminals 26 and 27 and the terminals 18 and 19 are in engagement, one terminal of the field winding 30 is connected directly to the ground. When the terminals 26 and 27 are separated the same terminal of the field winding 30 is connected to the ground through the resistor 31 and regulator windings 10 and 13, the current traversing the field winding 30 being reduced mainly by the resistor 31. The effect of the field current passing alternately through and around the regulator coils 10 and 13 is to cause a continuous vibration of the contact members 26 and 27.

As the charging operation proceeds, the temperature of the several windings and the battery rises. The resistance of the coil 12, which has a negligible temperature coefficient, remains substantially constant, and the current traversing it remains at a substantially constant value. The increased resistance of the coils 10, 11 and 13 has no appreciable effect upon the regulation because the changes in value of the current traversing the several coils substantially neutralize each other. Since the current traversing the main coil 12 is substantially constant at varying temperatures, no correction is necessary for changes in temperature of the regulator windings. Such correction would be required if the flux traversing the several magnetic circuits were varied to any considerable degree as a result of temperature changes. It will be readily apparent that reliable operation of the regulator is dependent upon a substantially constant value of the flux traversing the several magnetic circuits under normal conditions. The rise in temperature causes the steel strip 24 to expand more than the nickel strip 25, and the tension of the spring 23 is accordingly decreased. The armature 21 may then be drawn downwardly by a smaller actuating force, and the voltage of the generator is decreased in accordance with the increased temperature of the generator structure. In the same manner, the spring 23 operates to vary the voltage of the generator in accordance with the variations in temperature caused by atmospheric conditions. When the initial temperatures of the battery and the generator are very low, as is the case in extremely cold weather, the voltage of the generator is correspondingly higher during the earlier portion of the charging. The voltage is reduced as the temperature of the generator structure rises, as described above.

Because of the location of the regulator, relatively to the generator structure, its action would be influenced by the leakage flux of the magnetic field of the generator and the cross-magnetizing effect of the generator armature if no means were provided to counteract such effects. The effect of the leakage field flux is neutralized by the shunt compensating coil 11 which is in series with the shunt field winding 30. The magnetizing effect of the coil 11 varies with the current traversing the shunt field and, since the leakage flux varies substantially with the field current, the coil 11 thus automatically compensates for the leakage flux. The armature reaction, which is proportional to the armature current, is compensated for by the series coil 10 which is in series with the armature 29.

It has been demonstrated by practical experience in connection with regulators constructed as above described that a mechanism which will operate successfully when it is not combined with, or located adjacent to, a dynamo-electric machine, is inoperative when subjected to the influences above mentioned. When the compensating coils 10 and 11 are added, the effects of the leakage flux and the armature reaction are automatically neutralized by opposing effects which correspond in degree to the disturbing effects, and the regulator operates with a high degree of accuracy. While the manner in which the regulator is affected by the magnetic forces of the dynamo-electric machine has not been definitely determined, it is supposed that the resultant of the magnetic fields produced by the leakage flux and the armature reaction is not parallel to or in alinement with the pole pieces of the electromagnet. The magnetization of the several pole pieces is, therefore, not equal and the effects are unbalanced. Moreover, the resultant field of the dynamo-electric machine varies in direction and intensity in accordance with changes in the several controlling factors, and its effect upon the regulator varies to a corresponding degree. A regulator arranged as described above operates to control the voltage of a dynamo-electric machine with substantially the same degree of accuracy as though the disturbing influences were entirely eliminated.

When the armature current reaches a predetermined value, the series coil 13 is sufficiently energized to magnetically saturate the core member 9. Further increase in the armature current causes the series coil 10 to assist the shunt coil 12, with an increased force, to draw the armature 21 downwardly and thus lower the generator voltage. By means of this arrangement, I am enabled to cause changes in current value to operate, in the same manner and with the same effect as changes in voltage, to control the generator voltage.

Should sudden changes in current value occur, the damper winding 14 operates in a well known manner to cause such changes to induce a flux opposed to the change in value of the current traversing the series coil 13. The series coil 10 operates, as above described in connection with the saturation of the core 9, to assist the shunt coil 12 to a greater or a lesser degree in accordance with the direction of change of current value and thus cause sudden changes in current value to operate in the same manner and with the same effect as changes in voltage. In case the current increases in value suddenly, the damper winding 14 induces a flux which substantially neutralizes the effect of the increased current traversing the series coil 13 on the several magnetic circuits. The increased effect of the series coil 10 is, however, not neutralized because of the action of the damper winding. The coil 10 operates, therefore, with an increased force to assist the coil 12 in drawing the armature 21 downwardly. The sudden increase in current value has operated to produce an effect similar to that caused by a corresponding change in voltage. The voltage is regulated for a value below normal during such change. When the current suddenly decreases in value, the damper winding operates to neutralize the tendency of the coil to affect the regulation. The coil 10 is energized to a lesser degree to assist the coil 12 in controlling the armature 21, and the voltage is increased above its normal value during such change. Gradual changes in the armature current may occur without appreciably affecting the regulation. Under such conditions, the effect of the damper winding is negligible.

In case the speed of the generator decreases to such an extent that its voltage is less than that of the battery, current will tend to flow in the reverse direction through the generator circuit. The series coil 13, which normally assists the shunt coil 12, then opposes the latter, and the armature 16 is released to break the charging circuit and thus prevent the discharge of the battery.

By means of the above described mechanism, I am enabled to automatically regulate the voltage of an electric generator within any limits desired and in accordance with variations in temperature. I have provided, also, a simple and efficient means for controlling the charging circuit of a generator in accordance with circuit conditions. My invention provides a structure which is economical in construction and which occupies little space, since two devices are combined to form a unitary structure, parts of which are common to the two devices.

I claim as my invention:

1. In an electrical system, the combination with an electromagnet comprising a coil, and having a plurality of magnetic circuits, and a circuit-controlling member in one of said magnetic circuits adapted to be actuated when a predetermined voltage is applied to said coil, of means for varying the voltage at which said member is actuated, said means comprising a second circuit-controlling member in another of said magnetic circuits which controls the reluctance of the magnetic circuit of the first member.

2. In an electrical system, the combination with an electrical circuit comprising two coacting contact members and a mechanically vibrated element for carrying one of said contact members, of means for automatically controlling the position of said element to prevent the engagement of said contact members.

3. In an electrical system, the combination with a circuit-controlling member comprising a rapidly vibrating element, a pair of coacting contact members, one of which is carried by said element, of a slowly vibrating member for actuating said element to prevent the engagement of said contact members, and means for controlling said vibrating member.

4. In an electrical system, the combination with an electrical circuit comprising two coacting contact members, and a mechanically vibrated element for carrying one of said contact members, of an electromagnetically vibrated member for controlling said element, and an electromagnet for controlling said vibrated member in accordance with the voltage value applied to said electromagnet.

5. In an electrical system, the combination with a generator having field magnet windings, of means for controlling the excitation of said windings in accordance with the voltage values of the generator and in accordance with the rate of change in value of the current traversing the generator circuit, said means comprising an electromagnet having a core member consisting of a plurality of branch portions, coils in circuit with said generator surrounding said branch portions, a closed coil on one of said branch portions, and a movable member controlled by said electromagnet.

6. In an electrical system, the combination with an electric generator, of means for regulating the field excitation of said generator, said means comprising an electromagnet having a plurality of branch portions, coils surrounding said branch portions, a damper winding on one of said branch portions inductively related to one of said coils and an armature member controlled by said electromagnet.

7. In an electrical system, the combination with a generator, of means for regulating the voltage of said generator in accordance with the rate of change in the value of current traversing the generator circuit, said regulating means comprising an electromagnet having a branch portion surrounded by two inductively related coils and an armature member controlled by said electromagnet.

8. In an electrical system, the combination with a generator, of means for controlling the field excitation of said generator, said means comprising an electromagnet having a body member having a plurality of branch portions to form core members, coils surrounding said branch portions and in circuit with said generator, one of said branch portions being provided with opposing coils and a second of said branch portions being provided with a damper winding.

9. In an electrical system, the combination with a generator having field magnet windings, of means for controlling the excitation of said windings in accordance with the rate of change in value of the current traversing the generator circuit, said means comprising a plurality of coils in circuit with said generator and a damper winding inductively related to one of said coils.

10. In an electrical system, the combination with a generator having a shunt field winding and a resistor in circuit therewith, of means for controlling said resistor in accordance with temperature conditions, said means comprising an electromagnet having branch portions and coils in circuit with said generator having temperature coefficients of different values.

In testimony whereof, I have hereunto subscribed my name this 31st day of July, 1914.

FRANK CONRAD.

Witnesses:
 INA BROWN,
 B. B. HINES.